(12) United States Patent
Walker

(10) Patent No.: US 9,040,896 B2
(45) Date of Patent: May 26, 2015

(54) OPTOELECTRONIC-DEVICE WAFER PROBE AND METHOD THEREFOR

(76) Inventor: James Albert Walker, Freehold, NJ (US)

( * ) Notice: Subject to any disclaimer, the term of this patent is extended or adjusted under 35 U.S.C. 154(b) by 497 days.

(21) Appl. No.: 13/539,782

(22) Filed: Jul. 2, 2012

(65) Prior Publication Data

US 2013/0001405 A1  Jan. 3, 2013

Related U.S. Application Data

(60) Provisional application No. 61/503,846, filed on Jul. 1, 2011.

(51) Int. Cl.
*G01J 1/04* (2006.01)
*G01J 1/42* (2006.01)

(52) U.S. Cl.
CPC ........ *G01J 1/0425* (2013.01); *G01J 2001/4247* (2013.01); *G01J 1/0451* (2013.01); *G01J 1/0411* (2013.01)

(58) Field of Classification Search
USPC ............ 250/208.2, 214.1, 214 R; 385/88–94
See application file for complete search history.

(56) References Cited

U.S. PATENT DOCUMENTS

| | | | |
|---|---|---|---|
| 5,500,540 A * | 3/1996 | Jewell et al. ..................... 257/82 |
| 5,887,009 A * | 3/1999 | Mandella et al. .................. 372/6 |
| 2004/0184707 A1* | 9/2004 | Jewell et al. ..................... 385/14 |
| 2006/0239605 A1* | 10/2006 | Palen et al. ..................... 385/14 |

\* cited by examiner

*Primary Examiner* — Seung C Sohn
(74) *Attorney, Agent, or Firm* — Kaplan Breyer Schwarz & Ottesen, LLP

(57) ABSTRACT

A probe card for wafer-level testing a plurality of optoelectronic devices on a wafer is provided. The probe card has both electrical and optical functionality. The probe card comprises a plurality of lenslets aligned with the plurality of optoelectronic devices to improve the optical coupling efficiency between each of the plurality of optoelectronic devices and a plurality of optical waveguides located on a probe head.

19 Claims, 3 Drawing Sheets

OPTOELECTRONIC-DEVICE WAFER PROBE AND METHOD THEREFOR

CROSS REFERENCE TO RELATED APPLICATIONS

This application claims the benefit of U.S. Provisional Application Ser. No. 61/503,846, filed Jul. 1, 2011, entitled "Optoelectronic-Device Wafer Probe and Method Therefor,", which is incorporated by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to wafer probe test fixtures for the semiconductor industry in general, and, more particularly, to wafer probe fixtures for optoelectronic device wafers.

BACKGROUND OF THE INVENTION

Wafer-level testing (i.e., on-wafer testing) is a critical part of high-volume production for most semiconductor devices. For electronic devices, wafer-level testing is relatively straightforward. A probe card containing hundreds to thousands of probe pins is placed into contact with the devices on the wafer. The probe pins make electrical contact with electrical pads located on the devices so that electrical signals can be transmitted between the probe card and the devices. Electrical signals received from the devices are used to determine whether the devices are operating as expected or are defective.

Doing on-wafer testing of optoelectronic devices is also critical to providing low cost, high performance products in many growing application areas, such as optical telecommunications, lighting, displays, and more. For optoelectronic devices, however, wafer-level testing is more complicated. In addition to requiring electrical connectivity to the devices on the wafer, optical communication to or from the devices is also required. For optical sources, such as light emitting diodes (LEDs), vertical-cavity surface-emitting lasers (VCSELs), and the like, this can be very difficult as such devices typically emit light over a rather large range of angles. Sufficient light must be captured to enable characterization of the light sources with a high degree of certainty. Specifically, enough light must be captured to enable a sufficiently high signal-to-noise ratio (SNR) that such as characteristics as optical power output (luminosity) and spectral behavior can be determined.

LEDs, in particular, have become increasingly desirable light sources for illumination applications, such as task lighting, general illumination, flashlights, automobile headlamps, automobile tail lights, and "architainment" fixtures (i.e., decorative illumination, such as replacements for neon signage, etc.). The cost of LEDs (as compared to other illumination sources, such as incandescent bulbs, compact fluorescent bulbs, etc.), however, has thus far limited the widespread adoption of LEDs in cases.

Much of the cost associated with LEDs arises from the challenges inherent to wafer-level testing to determine its optical output power and spectral characteristics. Currently, wafer-level testing is done by sequentially positioning a lightwave probe comprising a single optical fiber, such as a Cascade LWP Series light wave probe, over each LED on the wafer, energizing that device, coupling the output light from the LED into the fiber, and then characterizing the light at a photodetector and spectrum analyzer. The time required for the analysis of the light is relatively short. The time spent moving the probe head from device to device and settling it to enable a stable measurement can be quite long, however. In a mass production environment, time means expense.

In an effort to reduce the time required for wafer test, approaches for testing several LEDs while the probe head remains at one position are being considered. In some cases, an integrating sphere is used to capture the light from several LEDs on a wafer, wherein the LEDs are individually energized with an electric current. The integrating sphere is optically coupled to a photodetector and/or spectrum analyzer to characterize the output of the device under test (DUT). In some cases, multiple LEDs are characterized by testing a number of LEDs that are near, but not aligned with, the position of the probe head that contains a single optical fiber. The wide emission angle of a typical LED (often having an included angle of up to 120°) enables light from these unaligned LEDs to couple into the optical fiber, although with different coupling efficiencies. Since the coupling efficiency of an unaligned LED is a function of the displacement of that LED from the optical axis of the fiber, it is possible to estimate the luminosity of the unaligned LEDs based on the amount of light coupled into the fiber. Unfortunately, such an approach provides only an approximation of the luminosity for the off-axis LEDs in an array.

More preferably, a probe head can include an array of N optical fibers that are spaced along a line at the same pitch as the LEDs on the wafer to be tested. These optical fibers can be fusion-spliced to that they collectively form a 1×N fiber coupler having one output and N inputs. During wafer probing, therefore, the inputs are positioned so that each input is aligned with a different LED on the wafer. Each LED is then individually energized so that its light can be characterized. With the probe head in a single position, therefore, N LEDs can be tested in rapid sequence. It is preferable that these optical fibers are single-mode optical fibers; however, in many cases, multi-mode optical fibers are used because of their larger acceptance angle.

Unfortunately, conventional approaches to optical wafer-level testing have several disadvantages. First, due to the wide emission pattern of the LEDs, some of the light of each LED is also be coupled into input fibers other than the input fiber aligned with that LED. This complicates the measurement results since the coupling efficiency at the additional input fibers is not well characterized.

Second, in order to mitigate damage to the valuable LEDs and provide space for the wafer probe card used to electrically connect with the LEDs, the probe head is typically located 1-2 millimeters away from the surface of the wafer being tested. As a result, the intersection of the acceptance cone of each optical fiber and the emission pattern of its corresponding LED is small. Only a small fraction of the light emitted by each LED, therefore, is coupled into its corresponding optical fiber. This results in a low signal-to-noise ratio (SNR) for the measurement, which degrades the accuracy and precision of the measured results.

Third, in many cases, the LEDs on an LED wafer are fabricated at a pitch that approaches, or is smaller than, the diameter of a typical optical fiber. As a result, in such cases, the optical fibers need to be thinned to achieve a matching fiber pitch, making them expensive and fragile.

As a result, it is highly desirable to improve wafer-level testing of optoelectronic devices.

SUMMARY OF THE INVENTION

The present invention enables improved coupling efficiency between optoelectronic devices (e.g., LEDs, VCSELs, super luminescent diodes, etc.) disposed on a wafer and one or more optical waveguides (e.g., optical fibers or PLC-based waveguides) located on a wafer probe head. As a result, the present invention enables wafer level testing of optoelectronic devices at a faster rate than can be attained with prior art systems and methods. Embodiments in accordance with the present invention enable the optical waveguide(s) to more efficiently couple light from each of a plurality of light sources on the wafer. The light sources, therefore, can be wafer probe tested in rapid sequence while the array of optical waveguides remains substantially stationary. For a probe head comprising multiple optical waveguides, this enables each optical waveguide to efficiently receive the light from only one light source while also mitigating the effects of cross talk and improving the accuracy of the light source characterization.

An illustrative embodiment of the present invention comprises a probe card having both electrical and optical functionality. The probe card is dimensioned and arranged to optically characterize each of a plurality of LEDs during wafer-level testing. The probe card includes apertures for the transmission of light through the probe card, wherein a lens is included at each aperture to focus or collimate the light as it transits the aperture. In some embodiments, the probe card comprises a substantially conventional electrical probe card that includes holes arranged in an arrangement that matches the arrangement of devices on a wafer to be tested. A lenslet plate comprising a lenslet array is then disposed over the electrical probe card so that each lenslet is aligned with a different one of the holes.

In some embodiments, at least one of the lenslets is a refractive lens. In some embodiments, at least one of the lenslets is a diffractive lens. In some embodiments, the lenslets are collimators. In some embodiments, the lenslets focus light at a focal plane.

Advantages of the present invention include:
 i. improved coupling efficiency of the LEDs to the optical waveguide in the probe head and improved signal-to-noise ratio;
 ii. the LEDs on the LED wafer are protected from damage during motion of the probe head during testing by the interposing lenslet plate;
 iii. improved precision of the measurement of each LED by reducing cross talk between optical waveguides in a multi-waveguide probe head; and
 iv. an increase in the number of useable optical waveguides in a multi-waveguide probe head by enabling the use of end waveguides to test on-axis LEDs rather than their being reserved for use during testing of off-axis LEDs.

In some embodiments, a probe card includes a substrate comprising one or more planar lightwave circuits that include vertical couplers arranged to match at least a portion of the arrangement of the optoelectronic devices under test. In some of these embodiments, the substrate also includes electrical traces and electrical probes for providing electrical signals to the optoelectronic devices. In some embodiments, the probes are metallic projections that extend outward from the electrical traces. In some embodiments, the probes are projections comprising substrate material that is metalized.

An embodiment of the present invention comprises an apparatus for wafer-level testing a plurality of optoelectronic devices arranged in a first arrangement on a device wafer, the apparatus comprising: (1) a probe card having electrical functionality and optical functionality, wherein the probe card comprises; (i) a first substrate comprising a plurality of apertures and a plurality of electrical pins, the electrical pins being arranged to electrically activate each of the plurality of optoelectronic devices; and (ii) a plurality of first lenses, the plurality of first lenses being disposed on the first substrate such that each of the plurality of first lenses is aligned with a different one of the plurality of apertures; wherein the plurality of apertures and the plurality of first lenses are arranged in the first arrangement.

DETAILED DESCRIPTION

Figure 1:
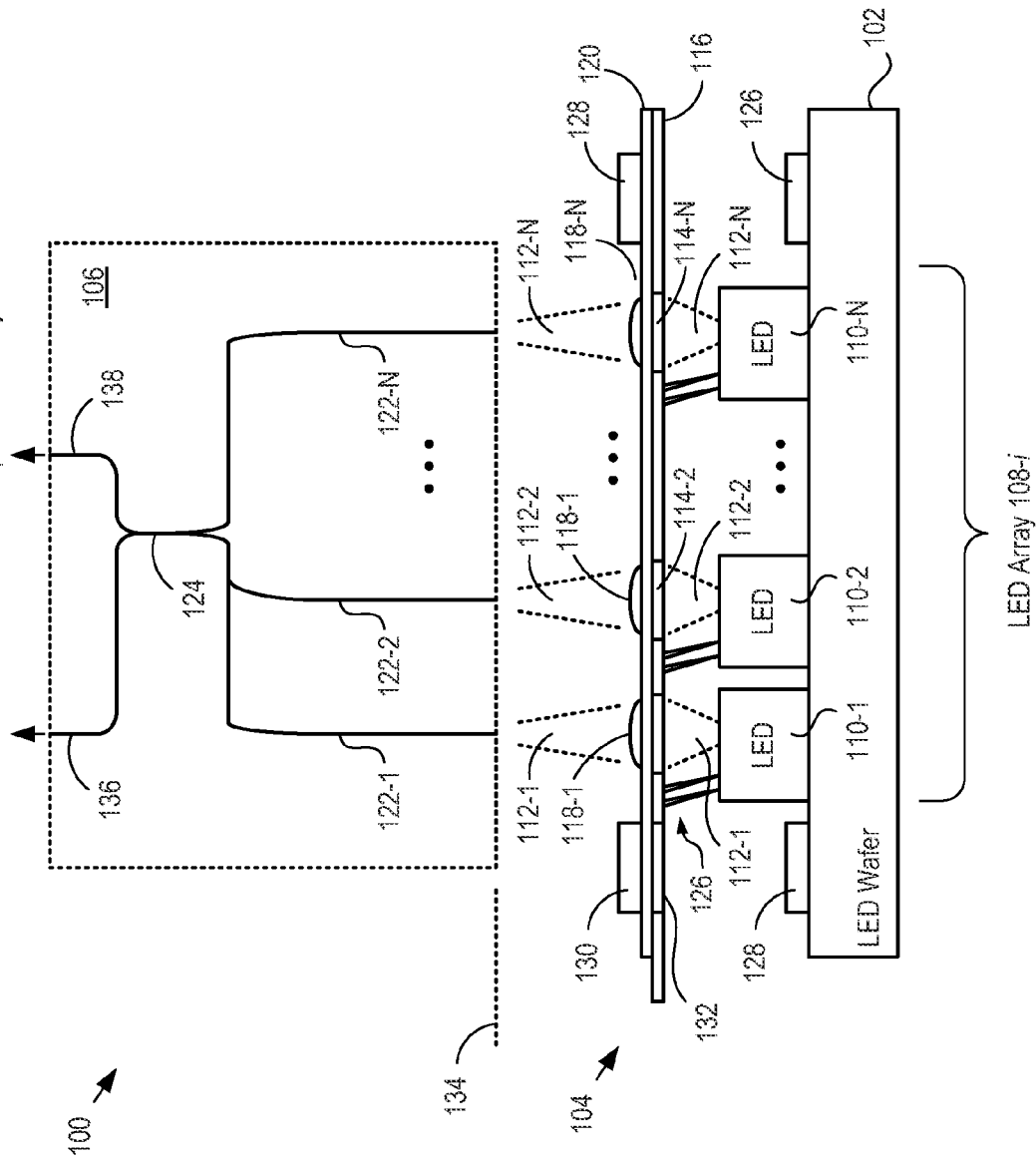
FIG. 1 depicts a probe system in accordance with an illustrative embodiment of the present invention.

FIG. 1 depicts a probe system in accordance with an illustrative embodiment of the present invention. System 100 comprises probe card 104 and probe head 106.

Figure 2:
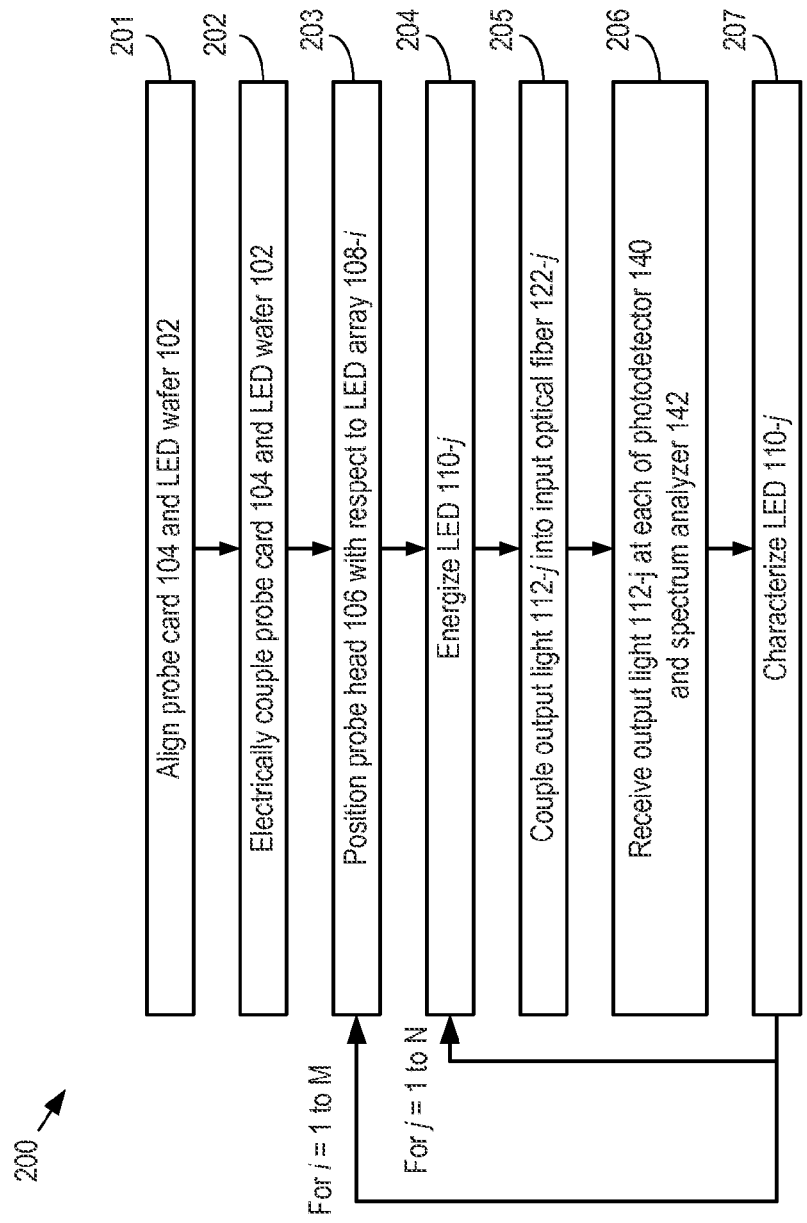
FIG. 2 depicts operations of a method suitable for use with probe system 100.

FIG. 2 depicts operations of a method suitable for use with probe system 100. Method 200 begins with operation 201, wherein probe card 104 is aligned with LED wafer 102. LED wafer 102 is a substrate comprising LEDs 110-1 through 110-N (referred to, collectively, as LEDs 110), which are LEDs suitable for lighting applications, and which are arranged in arrays 108-1 through 108-M. It should be noted that, although the illustrative embodiment is described in the context of wafer-level testing LED chips, the present invention is suitable for use in the optical probing of wafers of other optoelectronic devices, such as photodetectors, lasers, VCSELs, super luminescent diodes, and the like.

Probe card 104 is a probe card that has both electrical functionality and optical functionality. Probe card 104 comprises electrical probe card 116 and lenslet plate 120. Probe card 104 is depicted as having two electrical pins per LED. One skilled in the art will recognize, after reading this specification, that the number of electrical pins provided on a probe card is a matter of design and depends on the bond pad configuration of the devices under test. For example, in some embodiments, a probe card in accordance with the present invention might have only one electrical pin because the optoelectronic devices under test have a common electrical connection made through their substrate and underlying platen. In other embodiments, a probe card in accordance with the present invention might have more than two electrical pins per optoelectronic device under test.

Electrical probe card 116 is a substantially conventional probe card comprising a printed circuit board having electrical traces and pins 126. It will be clear to one skilled in the art how to specify, make, and use electrical probe card 116. In contrast to a conventional probe card, however, electrical probe card 116 also comprises apertures 114-1 through 114-N (referred to, collectively, as apertures 114), which enable light to pass through it without significant attenuation.

In some embodiments, electrical probe card 116 also comprises optional apertures 132, which enable optical alignment of probe card 104 and led wafer 102 via fiducials 128 and 130, as explained below.

Lenslet plate 120 is a glass substrate on which lenslets 118-1 through 118-N (referred to, collectively, as lenslets 118) are disposed. In some embodiments, lenslets 118 are formed from a portion of the glass substrate.

Lenslets 118 are conventional refractive lenslets suitable for receiving light signals 112-1 through 112-N (referred to, collectively, as signals 112) and focusing them at focal plane 134. In some embodiments, lenslets 118 are diffractive lenslets. Apertures 114 and lenslets 118 are arranged to match the arrangement of LEDs 110 on LED wafer 102.

In some embodiments, lenslets 118 receive light signals 112 and collimate them, thereby making it easier to align probe head 106 to receive the light signals. One skilled in the art will recognize, however, that in such embodiments, the coupling efficiency of light signals 112 into the optical waveguides on probe head 106 can be degraded.

Probe card 104 is aligned with LED wafer 102 using fiducials 128 and 130 before pins 126 are brought into electrical contact with LEDs 110. In some embodiments, pattern matching is used to align probe card 104 and LED wafer 102. In some embodiments, probe card 104 is aligned with LED wafer 102 by energizing a plurality of LEDs 110 and optimizing the optical coupling of their respective output signals 112 into waveguides 122. One skilled in the art will recognize that myriad ways to align probe card 104 and LED wafer 102 are known in the prior art.

At operation 202, probe card 104 is electrically coupled with LED wafer 102 by bringing pins 126 into physical contact with electrical pads located on each of LEDs 110 (not shown for clarity).

At operation 203, probe head 106 is positioned with respect to LED array 108-$i$, where i=1 to M and M is the number of LED arrays on LED wafer 102.

Probe head 106 comprises input optical fibers 122-1 through 122-N (referred to, collectively, as input optical fibers 122). Input optical fibers 122 are single-mode optical fibers that are fusion spliced such that they are optically coupled at bus fiber 124. Bus fiber 124 is split into two output optical fibers, output optical fibers 136 and 138. Output optical fiber 136 is optically coupled with photodetector 140. In some embodiments, probe head 106 includes one or more optical waveguides that are other than single-mode optical fibers. Suitable optical waveguides for use in probe head 106 include, without limitation, multi-mode optical fibers, surface waveguides, planar lightwave circuits, and the like.

At operation 204, LED 110-$j$, wherein j=1 to N, is energized with an electric current via pins 126. As a result, LED 110-$j$ emits output light 112-$j$. One skilled in the art will recognize that a conventional LED typically emits output light 112 such that it has an emission pattern that circumscribes a large included angle. In some cases this included angle can be 160° or more. In some embodiments, a plurality of LEDs 110 is energized at the same time and probe head 106 includes optical switches to enable characterization of the outputs of the individual LEDs. In some embodiments, each of LEDs 110 is energized individually via a row-column addressing scheme.

Typically, probe head 106 is positioned at a separation distance from the surface of LED wafer 102 of as much as 1-2 millimeters to avoid damage during motion of the probe head during wafer-level testing. In prior art wafer probe systems, this large separation enables output light 112-$j$ to couple into more than one input optical fibers 122, thereby complicating the determination of the output power of the LED. The present invention mitigates this fiber cross talk, however, providing a significant advantage over wafer probe systems known in the prior art.

At operation 205, lenslet 118-$j$ receives output light 112-$j$ and focuses it at focal plane 134, where it optically couples into input optical fiber 122-$j$. In some embodiments, lenslet 118-$j$ collimates output beam 112-$j$. In such embodiments, input optical fiber 122-$j$ couples less of the optical energy in output signal 112-$j$; however, the accuracy with which input optical fiber 122-$j$ must be aligned with the output beam is relaxed.

Input optical fiber 122-$j$ then conveys output light 112-$j$ to bus fiber 124, where the optical energy in the light is split into output optical fibers 136 and 138. Output optical fiber 136 is optically coupled with photodetector 140 and output optical fiber 138 is optically coupled with spectrum analyzer 142.

At operation 206, photodetector 140 receives a first portion of output light 112-$j$ and spectrum analyzer 142 receives a second portion of output light 112-$j$. Photodetector 140 generates an electrical signal based on the optical power in output light 112-$j$.

At operation 207, the outputs of photodetector 140 and spectrum analyzer 142 are processed to characterize the output of LED 110-$j$.

Operations 204 through 207 are then repeated for each of LEDs 110-1 through 110-N. Once all of LEDs 110-1 through 110-N have been optically characterized, probe head 116 is moved to another of LED arrays 108-1 through 108-M and operations 204 through 205 are repeated until all the LEDs on LED wafer 102 are characterized.

Figure 3:
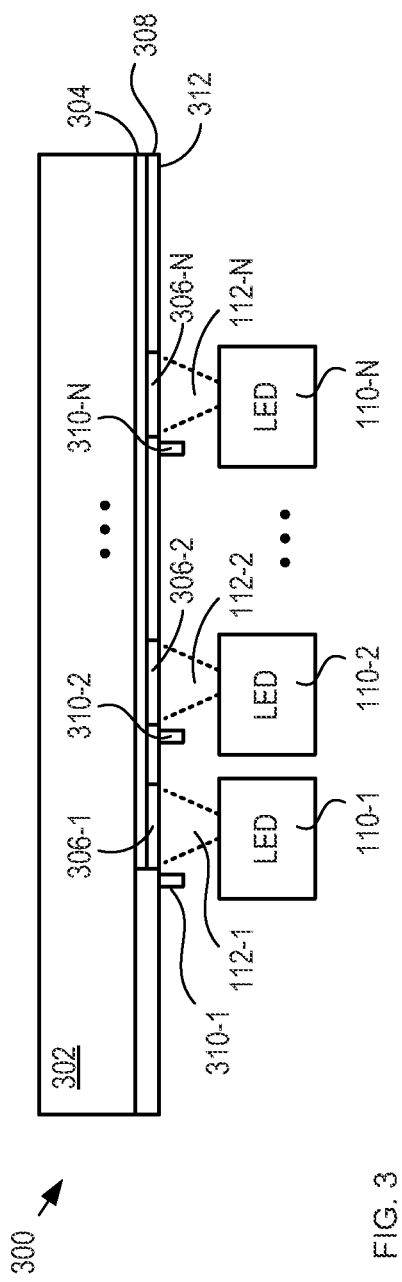
FIG. 3 depicts a portion of a probe card in accordance with a first alternative embodiment of the present invention.

FIG. 3 depicts a schematic drawing of a cross-sectional view of a portion of a probe card in accordance with a first alternative embodiment of the present invention. Probe card 300 comprises waveguide substrate 302, waveguide 304, vertical couplers 306, upper cladding 308, and pins 310.

Waveguide substrate 302 is a substrate supportive of the formation of a photonic lightwave circuit. Waveguide substrate 302 comprises a handle substrate, such as single-crystal silicon or glass, and a lower cladding layer, such as silicon oxide.

Waveguide 304 is a surface waveguide having low propagation loss at the wavelength of light signals 112. Preferably, waveguide 304 comprises a TriPleX™ waveguide structure, which includes a central core of silicon dioxide that is, for example, sandwiched or surrounded by outer core layers of silicon nitride. Examples of suitable TriPleX™ waveguide structures are described in U.S. Pat. No. 7,146,087, issued Dec. 5, 2006, which is incorporated herein by reference.

The TriPleX™ waveguide structure for waveguide 304 affords embodiments of the present invention significant advantages. Specifically, TriPleX™ waveguides can be designed for low-loss operation at wavelengths anywhere within the wavelength range from approximately 400 nanometers (nm) to approximately 1600 nm, whereas conventional waveguide structures are not well suited for operation at wavelengths below 900 nm. In addition, the low optical loss characteristics that can be attained using TriPleX™ waveguides enables a single bus waveguide to include a plurality of vertical couplers 306. Because conventional waveguides only loosely confine the optical mode of an optical signal propagating through it, the loss associated with a vertical coupler would preclude their use in many applications. Still further, the TriPleX™ waveguide structure is well suited to the formation of vertical couplers having high coupling efficiency. In some embodiments, waveguide 304 is a high-contrast waveguide having a core of pure silicon nitride.

It will be clear to one skilled in the art, after reading this specification, how to specify, make, and use alternative embodiments of the present invention in which waveguide 304 is based on any suitable surface waveguide structure.

Vertical couplers 306-1 through 310-N (referred to, collectively, as vertical couplers 306) are surface waveguide features that enable light signals 110 to couple into waveguide 304 with low loss. Examples of suitable vertical couplers are described in U.S. Pat. No. 7,250,317, issued Jul. 31, 2007, which is incorporated herein by reference. In some embodiments, one or more vertical couplers 306 includes a diffractive and/or refractive lens for improving the efficiency with which light signals 112 couple into waveguide 304.

In operation, waveguides 304 and vertical couplers 306 perform substantially the same function as lenses 118 and fibers 122, as described above and with respect to FIGS. 1 and 2.

Upper cladding 308 is a layer of dielectric, such as silicon oxide, that completes waveguide 304 and forms part of vertical couplers 306. In some embodiments, upper cladding 308 also provides the material from which diffractive and/or refractive lenses are formed as part of vertical couplers 306.

Pins 310-1 through 310-N (referred to, collectively, as pins 310) are conductive projections that project from surface 312. Pins 310 enable electrical drive signals to be coupled to LEDs 110. Pins 310 are formed in any conventional manner, such as electroplating, evaporation and patterning, sputter deposition and patterning, and the like. In some embodiments, pins 310 are conventional bump bonds.

Pins 310 are electrically addressed by conductive traces formed on surface 312 (not shown for clarity). In some embodiments, pins 310 are electrically connected in parallel so that all of LEDs 110 are energized at the same time. In some embodiments, some or all of pins 310 are electrically connected so as to enable some of LEDs 110 to be energized selectively (e.g., using row/column addressing, etc.).

Figure 4:
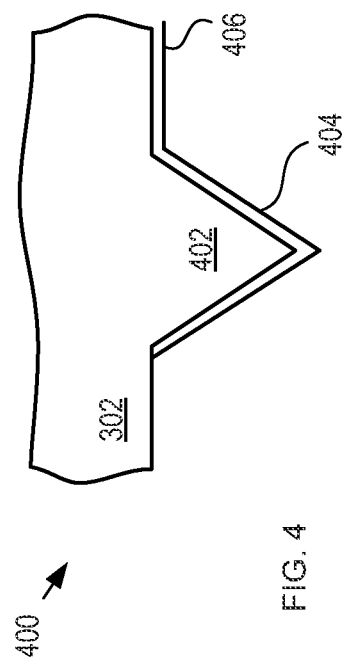
FIG. 4 depicts a schematic drawing of a cross-sectional view of a probe pin in accordance with a second alternative embodiment of the present invention.

FIG. 4 depicts a schematic drawing of a cross-sectional view of a probe pin in accordance with a second alternative embodiment of the present invention. Pin 400 comprises projection 402, layer 404, and trace 406.

Projection 402 is a projection formed on substrate 302 using conventional etching techniques, such as crystallographic etching, wet etching, reactive-ion etching, and the like. In some embodiments, projection 402 is formed by deposition of a suitable structural material.

Layer 404 is a layer of conductive materials formed on projection 402.

Trace 406 is a line of conductive material disposed on the surface of 302 to electrically interconnect one or more pins 400. Typically, trace 406 and layer 404 are formed in the same process, such as metal lift-off or subtractive patterning.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus for wafer-level testing a plurality of optoelectronic devices arranged in a first arrangement on a device wafer, the apparatus comprising:
   a probe card having electrical functionality and optical functionality, wherein the probe card comprises;
   (i) a first substrate comprising a plurality of electrical pins, the electrical pins being arranged to electrically activate each of the plurality of optoelectronic devices; and
   (ii) a plurality of first optical elements, the plurality of first optical elements being dimensioned and arranged to optically couple the plurality of optoelectronic elements and a plurality of optical waveguides; wherein the plurality of optical elements are arranged in the first arrangement.

2. The apparatus of claim 1 wherein at least one of the plurality of first optical elements is a refractive lens.

3. The apparatus of claim 1 wherein at least one of the plurality of first optical elements is a diffractive lens.

4. The apparatus of claim 1 wherein at least one of the plurality of first optical elements is a vertical coupler that is monolithically integrated with a planar lightwave circuit.

5. The apparatus of claim 1 wherein at least one of the plurality of first optical elements is dimensioned and arranged to collimate a diverging light beam.

6. The apparatus of claim 1 wherein at least one of the plurality of first optical elements is dimensioned and arranged to focus a diverging light beam at a focal plane.

7. The apparatus of claim 1 further comprising a probe head comprising the plurality of optical waveguides, the optical waveguides being arrayed along a first dimension with a first pitch, wherein the plurality of optical elements are arrayed along the first dimension with the first pitch.

8. The apparatus of claim 1 wherein the probe card further comprises (iii) a plurality of apertures, the first substrate comprising the plurality of apertures, and wherein each of the plurality of optical elements comprises a lens, and wherein the plurality of optical elements is disposed on the first substrate such that each of the plurality of first lenses is aligned with a different one of the plurality of apertures; and further wherein the plurality of apertures and the plurality of first lenses are arranged in the first arrangement.

9. The method of claim 1 wherein the probe card further comprises (iii) a planar lightwave circuit comprising at least one surface waveguide, and wherein each of the plurality of optical elements comprises a vertical coupler, and further wherein at least one of the plurality of vertical couplers is optically coupled with the surface waveguide.

10. An apparatus for wafer-level testing a plurality of optoelectronic devices arranged in a first arrangement on a device wafer, the apparatus comprising:
    a probe card having electrical functionality and optical functionality, wherein the probe card includes a substrate comprising;
    (i) a plurality of electrical pins, the electrical pins being dimensioned and arranged to electrically activate each of the plurality of optoelectronic devices;
    (ii) a plurality of surface waveguides; and
    (iii) a plurality of vertical couplers, the plurality of optical elements being arranged in the first arrangement, wherein the plurality of vertical couplers is dimensioned and arranged to optically couple the plurality of optoelectronic elements and the plurality of surface waveguides.

11. The apparatus of claim 10 wherein the probe card further comprises a plurality of lenses, wherein each of the plurality of lenses is substantially aligned with a different one of the plurality of vertical couplers.

12. The apparatus of claim 10 wherein the substrate comprises a first material, and wherein a first electrical pin of the electrical pins comprises the first material.

13. The apparatus of claim 12 wherein the first electrical pin comprises (1) a projection that projects from the substrate and (2) a first layer disposed on the projection, and wherein the first electrical pin is formed by operations including:

etching the substrate in a crystallographic etch to form the projection, the projection comprising the first material; and forming the first layer, the first layer comprising a second material that is electrically conductive.

14. A method for wafer-level testing a first plurality of optoelectronic devices that are arranged in a first arrangement on a device wafer, the method comprising:
aligning a probe card and the device wafer, wherein the probe card comprises a plurality of first optical elements that are arranged in the first arrangement; and
coupling a first light signal between a first optoelectronic device of the first plurality of optoelectronic devices and a first optical waveguide, wherein the first light signal is coupled through a first optical element of the plurality of first optical elements.

15. The method of claim 14 further comprising positioning a probe head with respect to a first optical element of the plurality of first optical elements, wherein the probe head comprises the first optical waveguide.

16. The method of claim 14 wherein the probe card comprises the first optical waveguide, and wherein the first optical element comprises a vertical coupler that is optically coupled with the first optical waveguide.

17. The method of claim 14 further comprising:
providing the device wafer such that each of the first plurality of optoelectronic devices is a light emitter that provides one of a plurality of light signals that comprises the first light signal; and
providing the probe card such that each of the plurality of first optical elements focuses a different one of the first plurality of light signals at a focal plane.

18. The method of claim 14 further comprising:
providing the device wafer such that each of the first plurality of optoelectronic devices is a light emitter that provides one of a plurality of light signals that comprises the first light signal; and
providing the probe card such that each of the plurality of first optical elements substantially collimates a different one of the first plurality of light signals.

19. The method of claim 14 wherein the probe card and device wafer are aligned by operations comprising:
providing the device wafer such that each of the first plurality of optoelectronic devices is a light emitter; and
energizing each of a second plurality of optoelectronic devices, each of the second plurality of optoelectronic devices being a light emitter, wherein the first plurality of optoelectronic devices comprises the second plurality of optoelectronic devices;
coupling the light signal from each of the second plurality of optoelectronic devices into a plurality of photodetectors; and
positioning the device wafer and the probe card relative to one another based on the output of each of the plurality of photodetectors.

\* \* \* \* \*